US012001422B2

(12) United States Patent
Yeo et al.

(10) Patent No.: US 12,001,422 B2
(45) Date of Patent: Jun. 4, 2024

(54) ACCURACY OF QA SYSTEMS BY NORMALIZING LOGICAL QUERIES

(71) Applicant: International Business Machines Corporation, Armonk, NY (US)

(72) Inventors: Hangu Yeo, Yorktown Heights, NY (US); Octavian Popescu, Yorktown Heights, NY (US); Elahe Khorasani, Yorktown Heights, NY (US); Vadim Sheinin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 16/367,509

(22) Filed: Mar. 28, 2019

(65) Prior Publication Data

US 2020/0311057 A1     Oct. 1, 2020

(51) Int. Cl.
*G06F 7/00* (2006.01)
*G06F 16/00* (2019.01)
*G06F 16/182* (2019.01)
*G06F 16/21* (2019.01)
*G06F 16/245* (2019.01)

(52) U.S. Cl.
CPC ........ *G06F 16/245* (2019.01); *G06F 16/1824* (2019.01); *G06F 16/211* (2019.01)

(58) Field of Classification Search
CPC ... G06F 16/245; G06F 16/1824; G06F 16/211
See application file for complete search history.

(56) References Cited

U.S. PATENT DOCUMENTS

| 9,613,025 | B2 | 4/2017 | Heo et al. |
| 9,959,311 | B2 | 5/2018 | Boguraev et al. |
| 2014/0149446 | A1* | 5/2014 | Kuchmann-Beauger ..................... G06F 16/283 707/763 |
| 2015/0286747 | A1* | 10/2015 | Anastasakos ........... G06F 40/40 707/776 |
| 2016/0225059 | A1* | 8/2016 | Chow ................. G06Q 30/0282 |
| 2017/0083569 | A1* | 3/2017 | Boguraev .......... G06F 16/24522 |
| 2017/0109434 | A1* | 4/2017 | Boxwell ................ G06N 20/00 |
| 2017/0270191 | A1 | 9/2017 | Levas et al. |
| 2018/0011887 | A1* | 1/2018 | Rozenwald ......... G06F 16/9024 |
| 2018/0039656 | A1* | 2/2018 | McConnell ........... G06F 16/211 |

OTHER PUBLICATIONS

Mel, et al. "The NIST Definition of Cloud Computing". Recommendations of the National Institute of Standards and Technology. Nov. 16, 2015.

Ganotkevitch et al., "PPDB: The Paraphrase Database", Proceedings of NAACL-HLT, Atlanta, GA, Jun. 9-14, 2013, 7 pages.

(Continued)

*Primary Examiner* — Tuan A Pham
(74) *Attorney, Agent, or Firm* — McGinn I.P. Law Group, PLLC

(57) ABSTRACT

A method, system and apparatus of processing queries, including inputting a query as query data, generating paraphrases from the query data, and normalizing the generated paraphrases according to predefined annotations of a schema.

18 Claims, 14 Drawing Sheets

(56) References Cited

OTHER PUBLICATIONS

Giordani, Alessandra, "Mapping Natural Language into SQL in a NLIDB", International Conference on Application of Natural Language to Information Systems NLDB 2008, Natural Language and Information Systems, Lecture Notes in Computer Science (LNISA), vol. 5039, pp. 367-371.
Li et al., "Constructing an Interactive Natural Language Interface for Relational Databases", Proceedings of the VLDR Endowment, vol. 8, No. 1, 2014, 12 pages.
Madnani et al., "Generating Phrasal and Sentential Paraphrases: A Survey of Data-Driven Methods", Computational Linguistics, vol. 36, No. 3, 48 pages.
Zhao et al., "Application-driven Statistical Paraphrase Generation", Proceedings of the 47th Annual Meeting of the ACL and the 4th IJCNLP of the AFNLP, Suntec, Singapore, Aug. 2-7, 2009, 9 pages.

* cited by examiner

FIG. 4

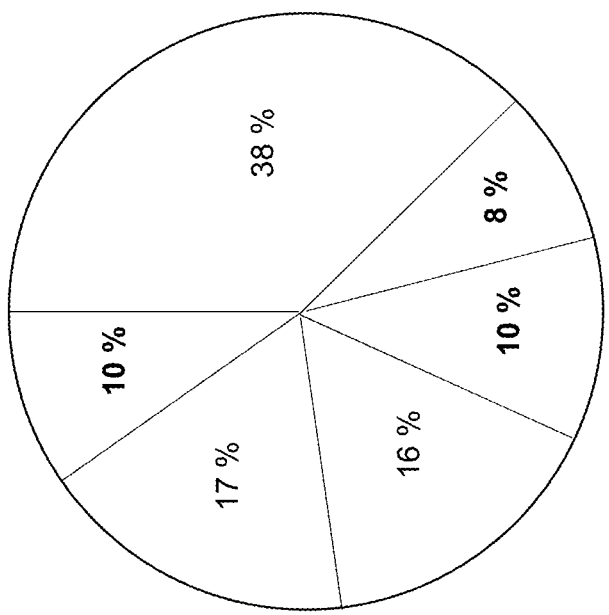

38%: simple questions (answered correctly)

17%: the answers are not available in DB

16%: complex questions (can be answered correctly by decomposing queries)

10%: ambiguous queries (can be answered by normalizing)0

10%: lack of template rules (can be answered either by adding template rules or normalizing)

8% : lack of annotation (can be answered either by adding annotations or normalizing)

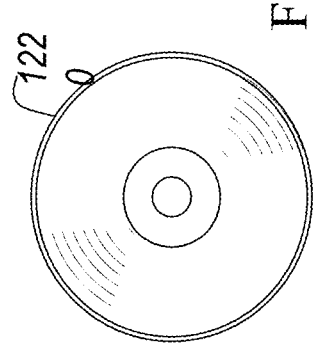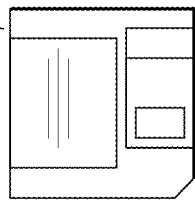
FIG. 11

ACCURACY OF QA SYSTEMS BY NORMALIZING LOGICAL QUERIES

BACKGROUND OF THE INVENTION

Field of the Invention

The disclosed invention relates generally to an embodiment of a method and system for supporting generation discriminable words, and more particularly, but not by way of limitation, relating to a method, apparatus, and system for improving accuracy of QA systems by normalizing logical queries.

Description of the Background Art

In today's world of massive access and use of information, there has been a problem of managing the large amount data. Databases have been set up to manage such information. However, searching such databases and data compilations have been a problem. To help with such queries, there has been research in generating Question and Answer (QA) systems. The QA systems can take an input question, analyze the question, and return results that attempt to provide the most probable answer to the input question. The QA systems attempt to provide automated mechanisms for searching through large sets of content and analyze the content with regard to an input question to determine an answer to the question.

However, the current systems have problems of accurately answering the questions inputted. Therefore, there is a need to have a QA system that is more efficient and improving accuracy in answering the questions.

SUMMARY OF INVENTION

In view of the foregoing and other problems, disadvantages, and drawbacks of the aforementioned background art, an exemplary aspect of the disclosed invention provides a method, apparatus, and system for improving accuracy of QA systems by normalizing logical queries.

One aspect of the present invention is to provide a method of logical queries, including inputting a query as query data, generating paraphrases from the query data, and normalizing the generated paraphrases according with predefined annotations of a schema.

Another aspect of the present invention provides a system for logical queries, including a memory storing computer instructions, and a processor configured to execute the computer instructions to input a query as query data, generate paraphrases from the query data, and normalize the generated paraphrases according with predefined annotations of a schema.

Another example aspect of the disclosed invention is to provide computer a computer program product comprising a computer readable storage medium having program instructions embodied therewith, the program instructions readable and executable by a computer to cause the computer to perform a method, including inputting a query as query data, generating paraphrases from the query data, and normalizing the generated paraphrases according with predefined annotations of a schema.

There has been thus outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 4 illustrates the accuracies of an example QUEST system.

FIG. 11 illustrates a signal-bearing storage medium for storing machine-readable instructions of a program that implements the method according to the example embodiment of the invention.

DETAILED DESCRIPTION OF PREFERRED EMBODIMENTS

Figure 1:
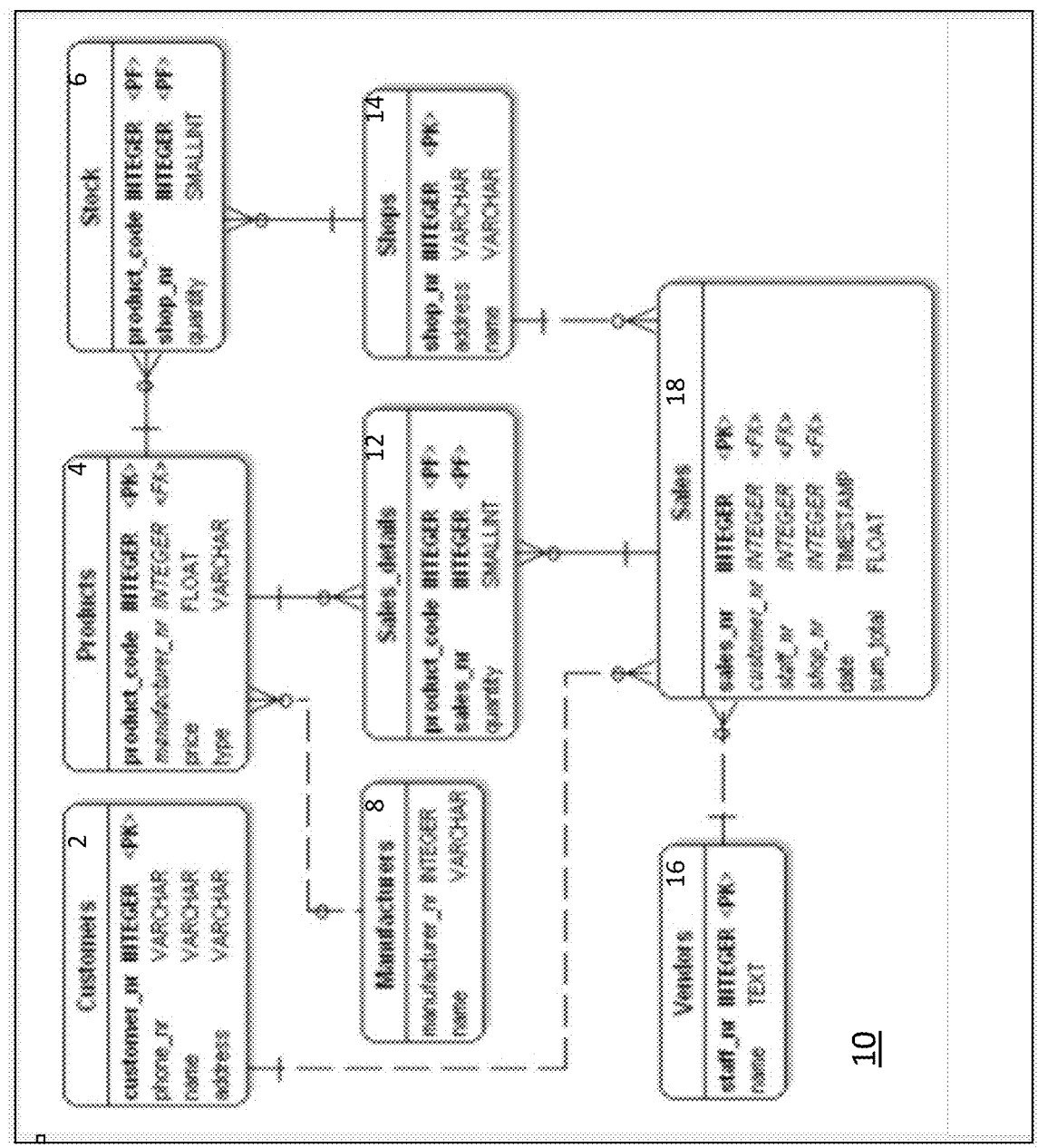
FIG. 1 illustrates an example schema of a database.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

FIG. 1 illustrates an example schema of a database. An example inquiry can be where John is the CMO of ABC Company. He wants to find out "What are the types of products that were sold on Oct. 11, 2014 in shops that are located in New York?". The schema for the sales warehouse database is shown where the database 10 includes the customer lists 2, products 4, stock 6, manufactures 8, sales details 12, shops 14, vendors 16, sales 18 and links shown therebetween in the database 10.

As mentioned above, current systems have problems of accurately answering the questions inputted, and so there is a need to have a QA system that is more efficient and with improved accuracy in answering the questions.

In one example, QUEST is a Natural Language Interface to Database System (NLIDB) which takes an input query from the user in Natural Language, translates it into an SQL (Structured Query Language) query, and retrieves the query results from the database. Natural language interfaces to database systems (NLIDB) allow the user to use natural language to analyze a database.

Figure 2:
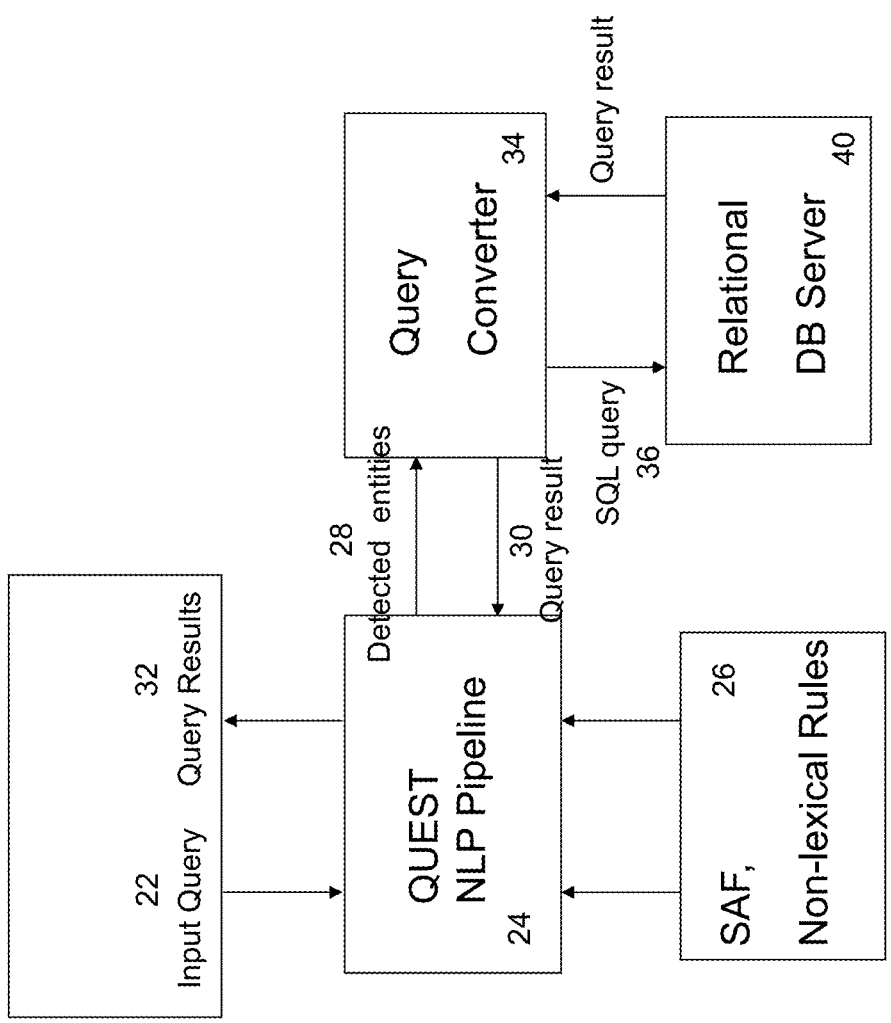
FIG. 2 illustrates a Natural Language Interface to Database System Pipeline.

FIG. 2 illustrates a Natural Language Interface to Database System Pipeline 20. An input query 22 is made to the QUEST NLP pipeline 24, which extracts entities from the input query in natural language using Lexical Rules 82 (See FIG. 3) which are generated by training Non-lexical Rules 80 (See FIG. 3) with the Schema Annotation File (SAF) 84 (See FIG. 3) offline 26. The QUEST NLP pipeline 24 sends detected entities 28 to an SQL conversion unit (Query Converter) that converts detected entities (data items) into SQL 34. The SQL Converter returns query results 30 as output to the QUEST NLP Pipeline 24 and the query results are returned to the user as query results 32. The Relational Database Server (RDBS) 40 receives SQL query 36 and gives the query result 38 back to the SQL Converter 34.

Figure 3:
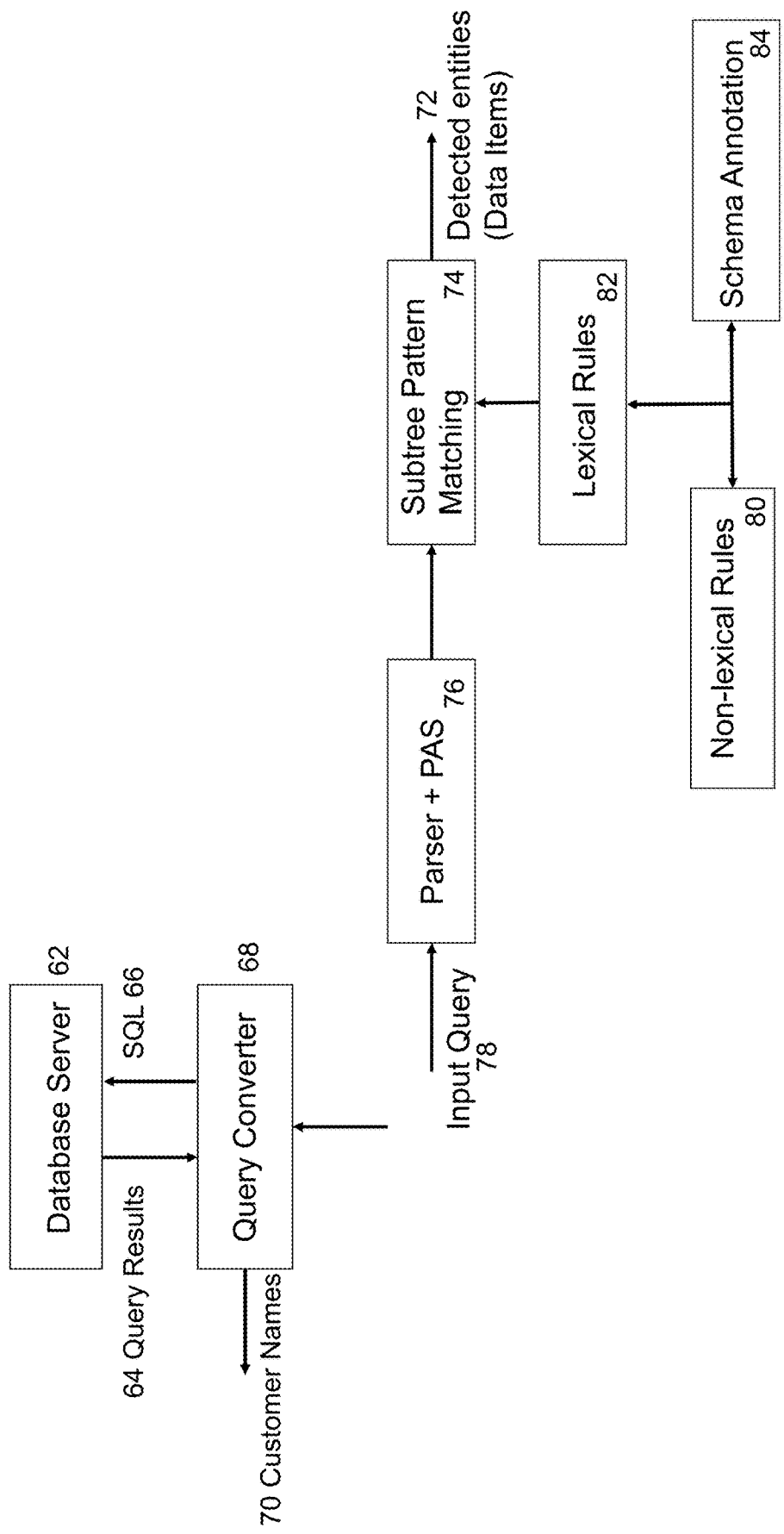
FIG. 3 illustrates further detail of Natural Language Interface to Database System Pipeline.

FIG. 3 illustrates further detail of Natural Language Interface to Database System Pipeline. First, the input query is made at point 78 and entered into the parser 76. An example input query 78 can be "Who bought product ABC in 2018?". Then, the Sub-tree Pattern Matching (SPM) algorithm 74 is applied and entities (data items) are extracted from the user input query. The SPM is rule-based and takes Predicate Argument Structure (PAS) output 76 and Lexical rules (82) as input and SPM detects various constructs. Then, the detected entities (data items) are outputted in point 72 to the Query Converter 68. The Query Converter 68 converts detected data items into an SQL query 66 to the database server 62 that returns query results 64 to the Query Converter 68, which then outputs a list of the customer names at point 70.

FIG. 4 illustrates the accuracies of an example QUEST system. The problems observed are the following from the current QA systems. Accuracies were measured with 250 test questions and the schema annotations are created manually. Initially, the QUEST system correctly answered 94 questions (38%) as seen in the pie chart. The system didn't answer 17% of the test questions because the answers were not available in the database. The complex questions (16% of test questions) were answered correctly after we decomposed the complex questions into a sequence of simple factoid questions. Despite all these efforts, the QUEST does not answer 28% of the test queries correctly due to missing (or wrong) data items generated as seen in the graph and relationships between data items are detected which are missing in the schema annotation. Therefore, there is a need for increased accuracy.

Figure 5:
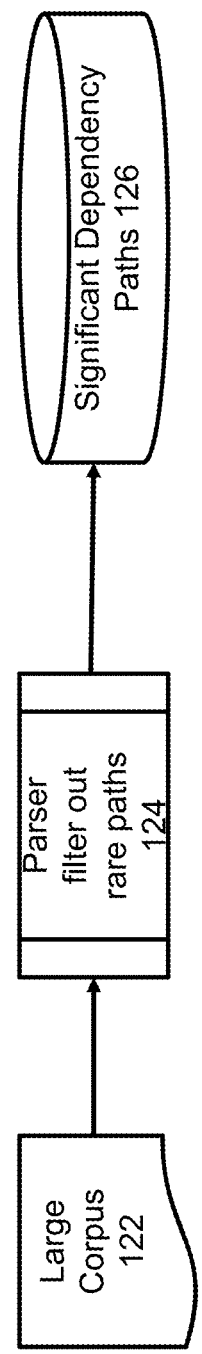
FIG. 5 illustrates paraphrase generation.

FIG. 5 illustrates paraphrase generation. As an example, after long discussions, a user questioned the legitimacy of the head of the organization because the user noticed certain facts, which are shown in the large corpus 122. The parser filters out rare paths 124, which is sent to the database of significant dependency paths 126. For example, the following data is stored:

The Subject: [PERSON];
Verb: "question legitimacy of"; and
Object: "head of organization".

Figure 6:
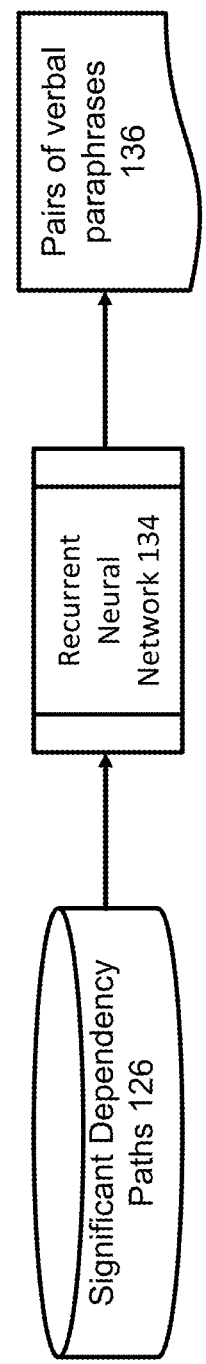
FIG. 6 illustrates further detail of paraphrase generation.

FIG. 6 illustrates further detail of paraphrase generation. The system constructs vectors of dependency paths 126 and feed them to neural network 134 for learning similarity of pairs of verbal paraphrases 136.

Figure 7:
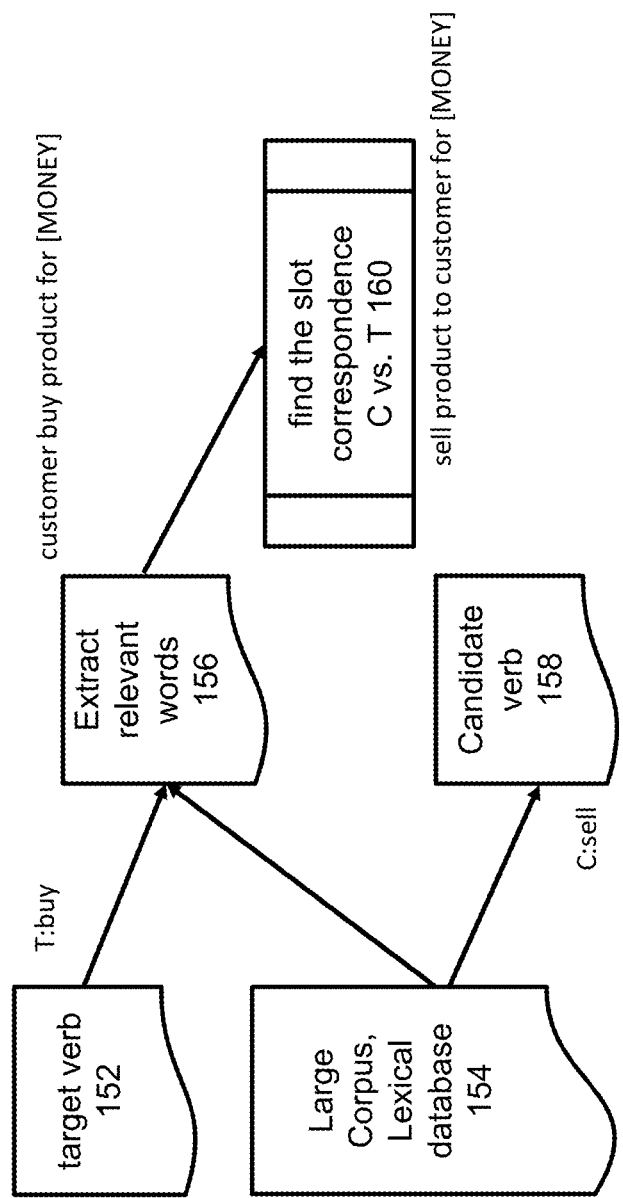
FIG. 7 illustrates further detail of paraphrase generation.

FIG. 7 illustrates additional detail of paraphrase generation showing a pattern paraphrase. The target verb (e.g., T: "buy") and the large corpus of a lexical database 154 is fed to extract relevant words 156, which extracts, for example, "customer buy products for [MONEY]. The large corpus 154 also outputs the candidate verb 158, such as C: "sell". Then system finds the slot correspondence C vs. T 160, where, it provides a pattern paraphrase of "sell product to customer for [MONEY]".

The pattern paraphrases are explained as follows. There is an Objective: Learn patterns of paraphrases. Instead of one shot learning of instances, the system learns how to generate paraphrases on the basis of acquired patterns from corpus 154.

For example, a user inquiry "I pay $700 for a laptop from Company L" is matched by the pattern: X pay Y for Z from U which can be paraphrased by the following:

X buy Y for Z;
X write check for Y;
X make payment of Y for Z;
X obtain Y for Z;
U offer Z for Y to X;
X authorize payment of Y for Z;
U have Z for Y;
X spend Y for Z;
U receive Y for Z from X;
X acquire Z for Y;
X receive Z for Y;
U accept payment from X for Z,
where X, Y, Z, U have to be in the following class respectively
Y is [MONEY] & X is [PERSON] & Z is [ARTIFACT] & U is [ORGANIZATION]; and
X in {client, customer} & Y in {commodity, merchandise, artifact} & U in {shop, store}.

Therefore, patterns encode the condition under which phrases and paraphrases, express the same meaning.

By normalizing the input logical queries, the QA system accuracy can be improved, and erroneous query results can be reduced. The efforts to create schema annotations can be reduced. Erroneous Query Results due to missing and wrong data items and wrong and new relationship between data items detected can be avoided.

Missing/wrong data items includes the following. The QUEST system fails to generate all the data items needed to answer the query when 'annotations do not support the query' or 'Template rules do not support the query'. The QUEST system fails to generate the data items when the parser does not parse the query correctly.

The wrong/new relationship between data items detected includes in a case of new relationship (the data items are found correctly but the relationship is not in a Schema Annotation File).

The following are examples in an example embodiment.
Who was the runner-up at the 1950 US Open? (answered correctly)

Who was the second place in the 2015 US Open? (couldn't answer)

Paraphrasing generates "player is in the second place" from 'player is a runner-up'.

Another example, is as follows:

Which player birdied in the first hole? (Parser cannot parse correctly.)

Which player made a birdie in the first hole? (Parser parses correctly.)

Paraphrasing generates "player makes a birdie" from 'player birdied'.

Another example, is as follows:

Which player won in the tournament? (answered correctly)

Which player obtained the victory in the tournament? (couldn't answer)

Paraphrasing generates "player obtains the victory in the tournament" from 'player wins in the tournament'.

Figure 8:
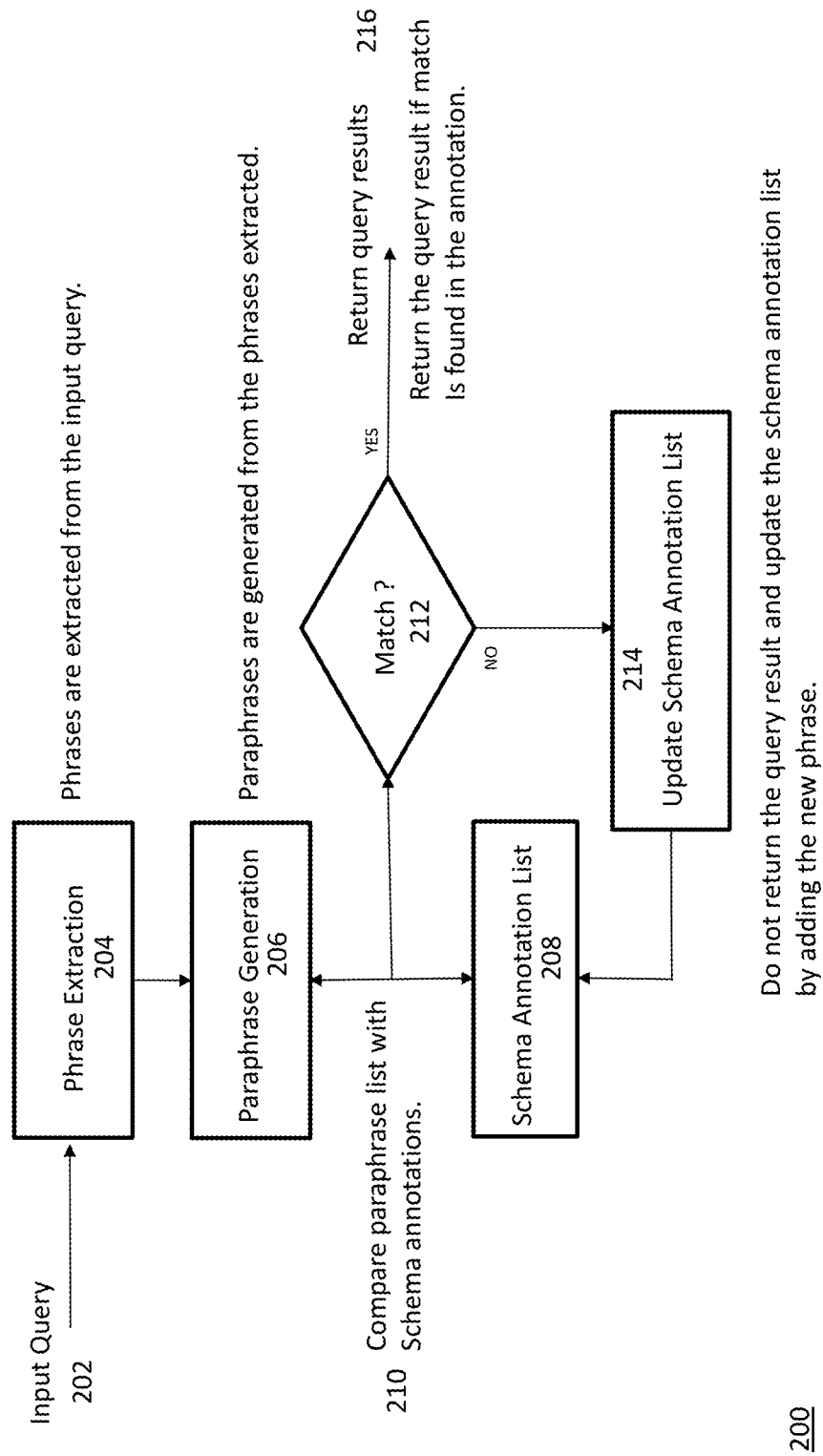
FIG. 8 illustrates a system of an example embodiment.

FIG. 8 illustrates a system of an example embodiment. The input query 202 is entered in the system 200, where the phrase is extracted 204 from the input query 202. The paraphrases are generated 206 from the phrases extracted 204. The system 200 compares 210 the paraphrase list generated 206 with a schema annotation list 208. From the comparison 210, if there is a match 212, then the system 200 returns the query result 216 if the match is found in the annotation list 208. If, there is no match 212 in the comparison, the schema annotation list 208 is updated in step 214. The system 200 does not return the query result and updates the schema annotation list 208 in step 214.

Therefore, from the above, it can be seen that the system 200 provides logical operation which normalizes user input queries according with predefined annotations of the schema. The system 200 also provides a way of rephrasing queries while preserving the logical intent. The system also provides adding new information to an existing annotation schema.

Therefore, with the present system 200, the accuracy of the answers to queries is highly improved.

Figure 9:
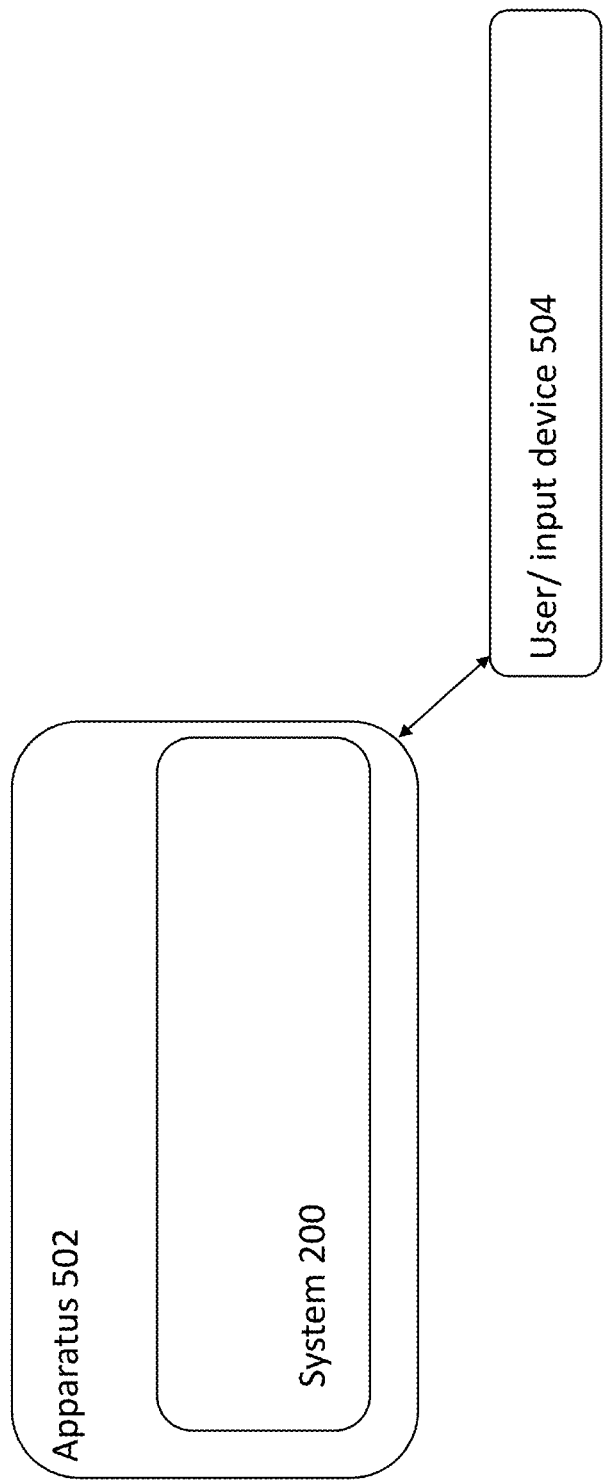
FIG. 9 illustrates an example configuration of the example embodiment.

FIG. 9 illustrates an example configuration of the example embodiment. The system 200 of the present invention can be configured in various forms. The following shows a plurality of examples in which system 200 can be configured as in an apparatus 502 that receives input form a user or input device 504. In addition to the examples of the system 200 shown, there can also be included specialized integrated circuit chips configured to process or co-process the techniques shown above.

Figure 10:
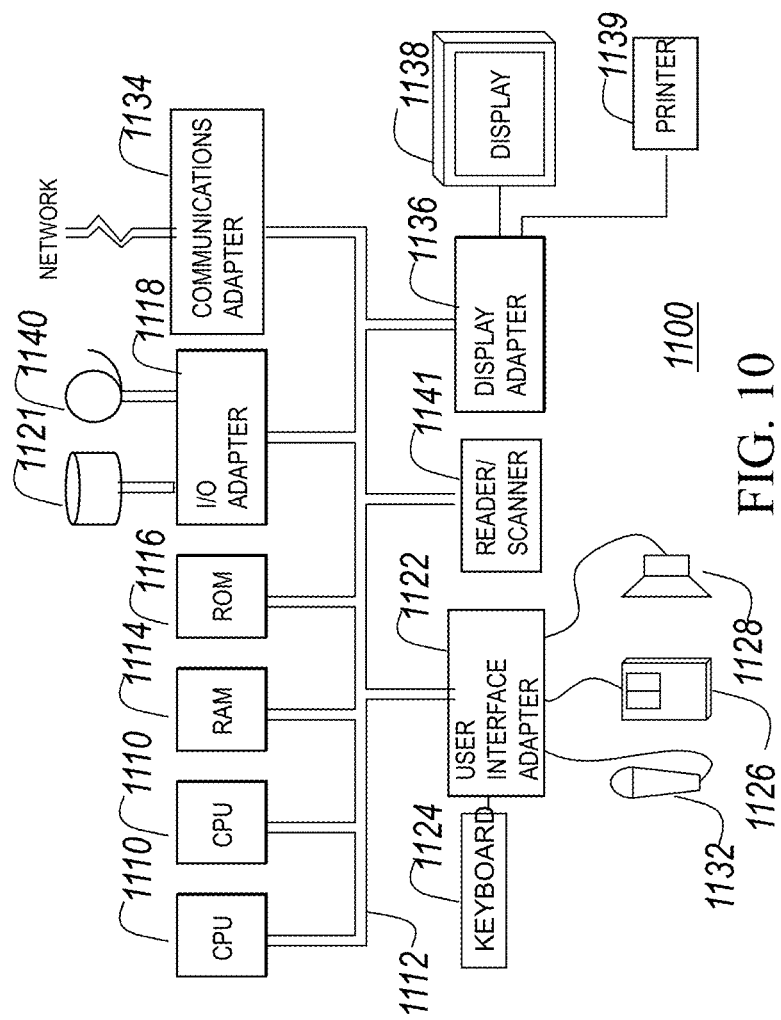
FIG. 10 illustrates an exemplary hardware/information handling system for incorporating the example embodiment of the invention therein.

FIG. 10 illustrates another hardware configuration of the system 100, where there is an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device (e.g., reader/scanner 1141) to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 11), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
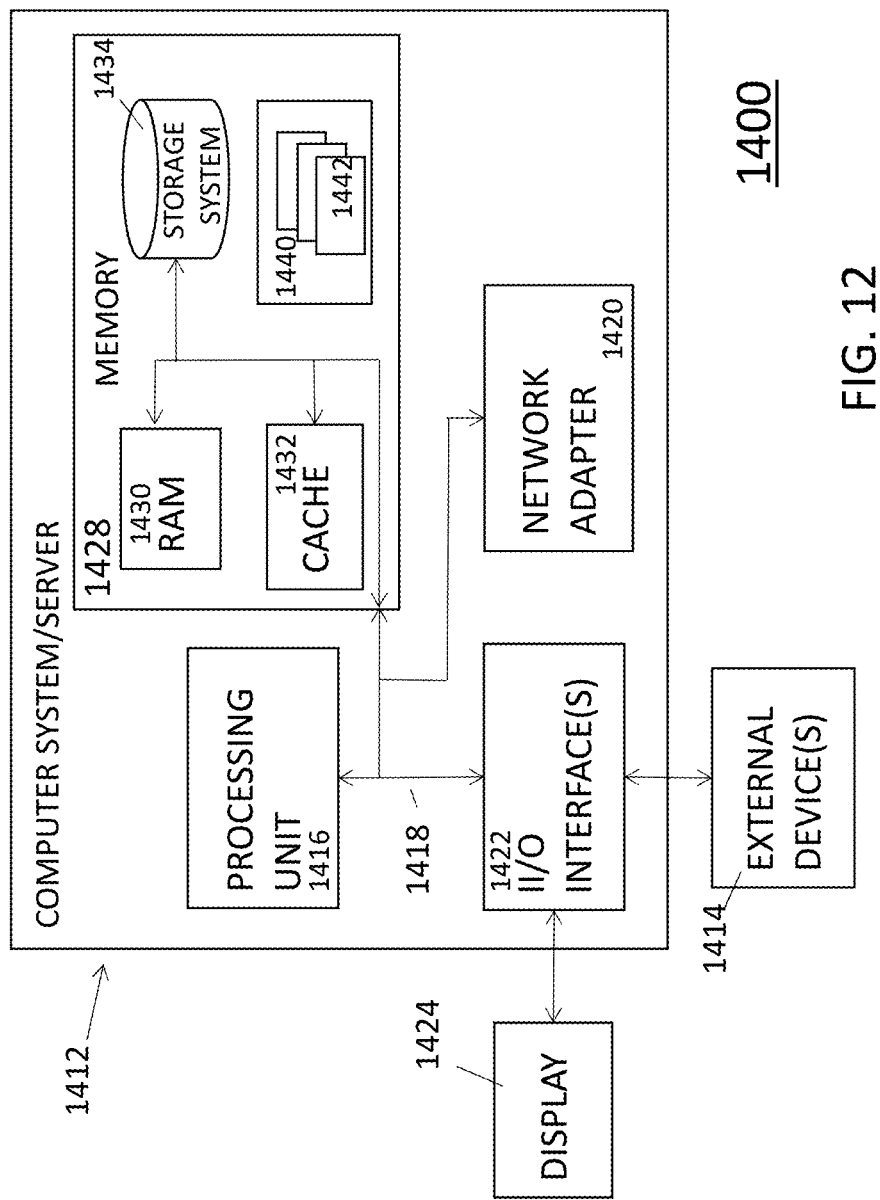
FIG. 12 depicts a cloud computing node according to an example embodiment of the present invention.

Referring now to FIG. 12, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 13:
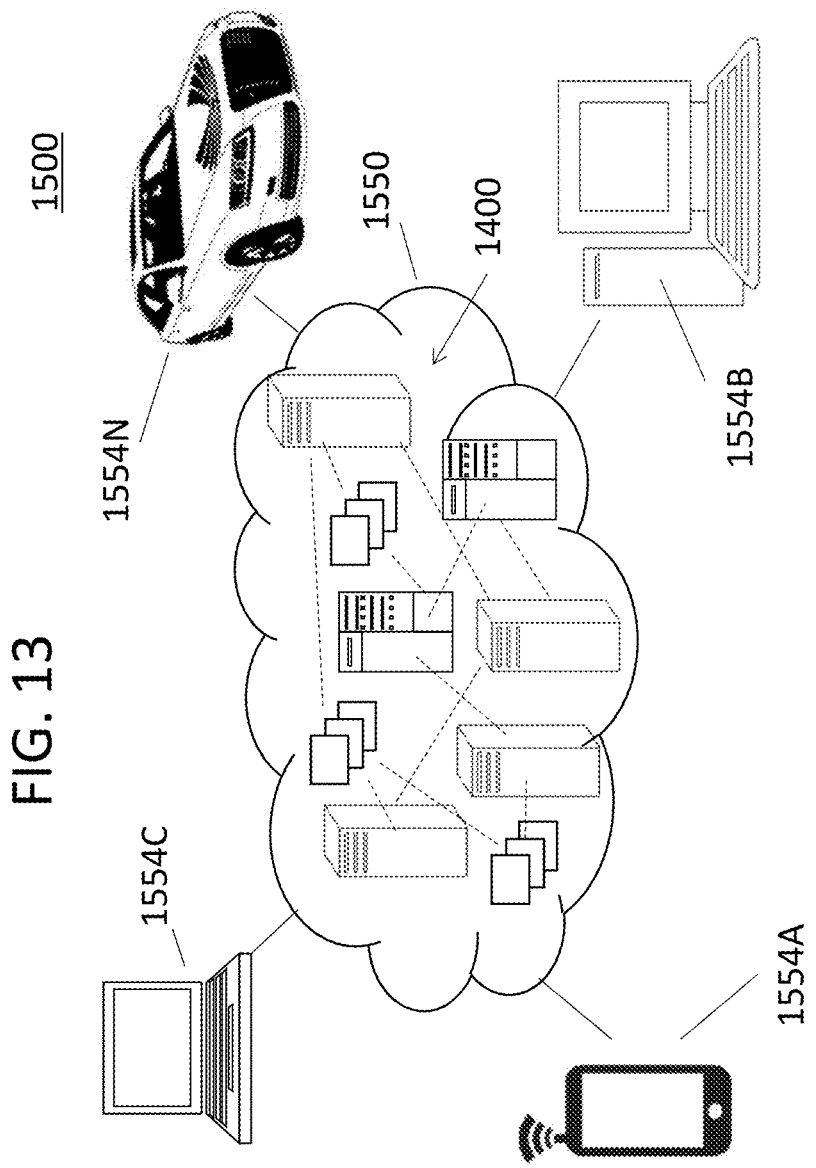
FIG. 13 depicts a cloud computing environment according to an example embodiment of the present invention.

Referring now to FIG. 13, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 13 are intended to be illustrative only and that computing nodes 1400 and cloud computing environment 1550 can communicate with any type of computerized device over any type of network and/or network addressable connection (e.g., using a web browser).

Figure 14:
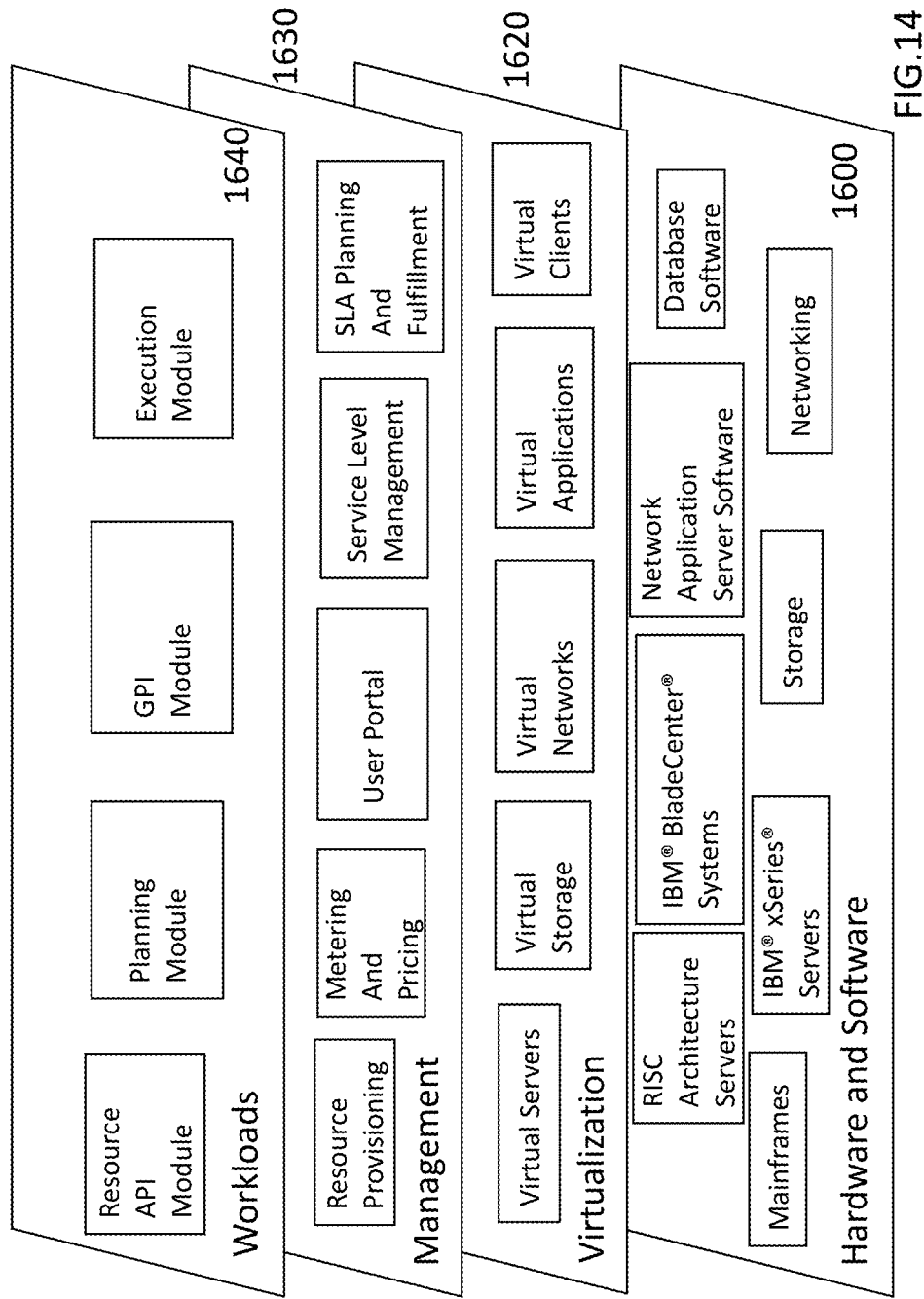
FIG. 14 depicts abstraction model layers according to an example embodiment of the present invention.

Referring now to FIG. 14, a set of functional abstraction layers provided by cloud computing environment 1550 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1620 provides an abstraction layer from which the following examples of virtual entities may be provided: virtual servers; virtual storage; virtual networks, including virtual private networks; virtual applications and operating systems; and virtual clients.

In one example, management layer 1630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1640 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of processing queries, comprising:
   inputting, by one or more computer processors, a query as query data;
   generating, by the one or more computer processors, a paraphrase from the query data, wherein generating the paraphrase further comprises:
     constructing, by the one or more computer processors, a vector of a dependency path;
     feeding, by the one or more computer processors, the vector of the dependency path to a neural network for learning a similarity of a pair of verbal paraphrases from the query data; and
     extracting, by the one or more computer processors, one or more words from the query data;
     rephrasing, by the one or more computer processors, the one or more words while preserving a logic intent of the query data; and
     providing, by the one or more computer processors, a pattern, wherein the pattern encodes a condition under which the phrase is a paraphrase, and wherein the paraphrase expresses a same meaning; and
   normalizing, by the one or more computer processors, the generated paraphrase according to predefined annotations of a schema, wherein normalizing the generated paraphrase further comprises:
     comparing, by the one or more computer processors, the paraphrase generated with a schema annotation list; and
     responsive to determining a match is not found in the comparison of the paraphrase generated with the schema annotation list, updating, by the one or more computer processors, the schema annotation list.

2. The method according to claim 1, wherein comparing the paraphrase generated with the schema annotation list further comprises:
   determining, by the one or more computer processors, whether and where a match exists between the paraphrase generated and the schema annotation list.

3. The method according to claim 1, further comprising:
   responsive to determining a match is found in the comparison of the paraphrase generated with the schema annotation list, returning, by the one or more processors, a query result.

4. The method according to claim 1 being cloud implemented.

5. The method according to claim 1, wherein the logical operation with a predetermined logical function normalizes input queries according with predefined annotations of the schema, and
   wherein the configuration of the annotation schema occurs after creation of the annotation schema with an update according to a comparison of a schema annotation list and a paraphrase list.

6. The method according to claim 1, wherein inputting a query as query data further comprises:
   extracting, by the one or more computer processors, one or more entities from the query data in a natural language format using a sub-tree pattern matching algorithm;
   outputting, by the one or more computer processors, the one or more entities to a Structured Query Language conversion unit to convert the one or more entities into a Structured Query Language; and
   returning, by the one or more computer processors, one or more query results.

7. The method according to claim 6, wherein the sub-tree pattern matching algorithm is a rule-based algorithm.

8. The method according to claim 7, wherein the sub-tree pattern matching algorithm receives as an input a Predicate Argument Structure output and a set of Lexical rules, and wherein the set of Lexical Rules are generated by training a set of Non-Lexical Rules with a Schema Annotation File in an offline setting.

9. A system for processing logical queries, comprising:
   a memory storing computer instructions; and
   a processor configured to execute the computer instructions to:
     input a query as query data;
     generate a paraphrase from the query data, wherein the computer instructions to generate the paraphrase further comprise:
       construct a vector of a dependency path; and
       feed the vector of the dependency path to a neural network for learning a similarity of a pair of verbal paraphrases from the query data; and
       extract one or more words from the query data;
       rephrase the one or more words while preserving a logic intent of the query data; and
       provide a pattern, wherein the pattern encodes a condition under which the phrase is a paraphrase, and wherein the paraphrase expresses a same meaning; and
     normalize the generated paraphrases according to predefined annotations of a schema, wherein the computer instructions to normalize the generated paraphrase further comprise:
       compare the paraphrase generated with a schema annotation list; and responsive to determining a match is not found in the comparison of the paraphrase generated with the schema annotation list, update the schema annotation list.

10. The system according to claim 9, wherein the computer instructions to compare the paraphrase generated with the schema annotation list further comprise:
determine whether and where a match exists between the paraphrase generated and the schema annotation list.

11. The system according to claim 10, the computer instructions further comprising to:
responsive to determining a match is found in the comparison of the paraphrase generated with the schema annotation list, return a query result.

12. The system according to claim 9, wherein an annotation schema is used to normalize the generated paraphrases, and
wherein new information is added dynamically to the annotation schema according to a comparison of the generated paraphrases and the annotation schema.

13. The system according to claim 9 is cloud implemented.

14. The system according to claim 9, wherein the computer instructions to input a query as query data further comprise:
extract one or more entities from the query data in a natural language format using a sub-tree pattern matching algorithm;
output the one or more entities to a Structured Query Language conversion unit to convert the one or more entities into a Structured Query Language; and
return one or more query results.

15. A computer program product comprising a computer readable storage medium having program instructions embodied therewith, the program instructions readable and executable by a computer to cause the computer to perform a method, comprising:
inputting a query as query data;
generating a paraphrase from the query data, wherein generating the paraphrase further comprises:
constructing a vector of a dependency path;
feeding the vector of the dependency path to a neural network for learning a similarity of a pair of verbal paraphrases from the query data; and
extracting one or more words from the query data;
rephrasing the one or more words while preserving a logic intent of the query data; and
providing a pattern, wherein the pattern encodes a condition under which the phrase is a paraphrase, and wherein the paraphrase expresses a same meaning; and
normalizing the generated paraphrases according to predefined annotations of a schema, wherein normalizing the generated paraphrase further comprises:
comparing the paraphrase generated with a schema annotation list; and
responsive to determining a match is not found in the comparison of the paraphrase generated with the schema annotation list, updating the schema annotation list.

16. The computer program product according to claim 15, wherein comparing the paraphrase generated with the schema annotation list further comprises:
determining whether and where a match exists between the paraphrase generated and the schema annotation list.

17. The computer program product according to claim 16, further comprising:
responsive to determining a match is found in the comparison of the paraphrase generated with the schema annotation list, returning a query result.

18. The computer program product according to claim 15, wherein inputting a query as query data further comprises:
extracting one or more entities from the query data in a natural language format using a sub-tree pattern matching algorithm;
outputting the one or more entities to a Structured Query Language conversion unit to convert the one or more entities into a Structured Query Language; and
returning one or more query results.

\* \* \* \* \*